United States Patent
Ishigaki et al.

(10) Patent No.: US 9,990,457 B2
(45) Date of Patent: Jun. 5, 2018

(54) SWITCHING CIRCUIT INCLUDING WIRE TRACES TO REDUCE THE MAGNITUDE OF VOLTAGE AND CURRENT OSCILLATIONS

(71) Applicant: TOYOTA MOTOR ENGINEERING & MANUFACTURING NORTH AMERICA, INC., Erlanger, KY (US)

(72) Inventors: Masanori Ishigaki, Ann Arbor, MI (US); Danny J. Lohan, Riverwoods, IL (US); Ercan M. Dede, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 138 days.

(21) Appl. No.: 14/993,756

(22) Filed: Jan. 12, 2016

(65) Prior Publication Data
US 2017/0202078 A1 Jul. 13, 2017

(51) Int. Cl.
*G06F 17/50* (2006.01)
*H05K 1/18* (2006.01)
*H05K 1/02* (2006.01)

(52) U.S. Cl.
CPC ....... *G06F 17/5077* (2013.01); *H05K 1/0242* (2013.01); *H05K 1/0243* (2013.01); *H05K 1/0298* (2013.01); *H05K 1/181* (2013.01); *H05K 2201/10166* (2013.01)

(58) Field of Classification Search
CPC ............. G06F 17/5077; H05K 1/0203; H05K 1/0298; H05K 1/181
See application file for complete search history.

(56) References Cited

U.S. PATENT DOCUMENTS

| | | | |
|---|---|---|---|
| 5,757,654 A | 5/1998 | Appel | |
| 5,760,571 A | 6/1998 | Latham, II et al. | |
| 5,977,626 A | 11/1999 | Wang et al. | |
| 7,015,569 B1 | 3/2006 | Tetelbaum | |
| 8,193,449 B2 | 6/2012 | Esmaili et al. | |
| 8,516,831 B2 | 8/2013 | Dede | |
| 8,772,634 B2 | 7/2014 | Beaupre et al. | |
| 2005/0068751 A1 | 3/2005 | Kim et al. | |

(Continued)

FOREIGN PATENT DOCUMENTS

WO  WO 2014/061114 A1  4/2014

OTHER PUBLICATIONS

Ercan M. Dede, "Simulation and optimization of heat flow via anisotropic material thermal conductivity", Computational Materials Science, vol. 50, 2010, pp. 510-515.

(Continued)

*Primary Examiner* — Vuthe Siek
(74) *Attorney, Agent, or Firm* — Oblon, McClelland, Maier & Neustadt, L.L.P.

(57) ABSTRACT

A device includes an electrical circuit having one or more parallel layers and one or more electronic components of a switching circuit configured to operate at one or more frequencies mounted to several layers of the electrical circuit. Wire traces electrically connecting the one or more electronic components have cutouts with predetermined patterns and dimensions formed along edges where AC current flow is concentrated to increase an effective edge length of the wire traces to reduce oscillation and heat loss of the traces.

20 Claims, 11 Drawing Sheets

(56) References Cited

U.S. PATENT DOCUMENTS

| | | | |
|---|---|---|---|
| 2013/0153950 A1* | 6/2013 | Mizutani | H01L 33/40 |
| | | | 257/99 |
| 2014/0284039 A1 | 9/2014 | Dede et al. | |
| 2014/0318758 A1 | 10/2014 | Dede et al. | |
| 2014/0318829 A1 | 10/2014 | Dede et al. | |
| 2016/0190231 A1* | 6/2016 | Ishimaru | H01L 21/263 |
| | | | 257/66 |

OTHER PUBLICATIONS

Supradeep Narayana, et al., "Heat Flux Manipulation with Engineered Thermal Materials", Physical Review Letters, PRL, vol. 108, 2012, 5 pages.

Ercan M. Dede, et al., "Thermal-composite design optimization for heat flux shielding, focusing, and reversal", Structural and Multidisciplinary Optimization, Jul. 4, 2013, 12 pages.

Ercan M. Dede, et al., "Heat flux cloaking, focusing, and reversal in ultra-thin composites considering conduction-convection effects", Applied Physics Letters, vol. 103, 2013, 4 pages.

Ercan M. Dede, et al., "Design of Anisotropic Thermal Conductivity in Multilayer Printed Circuit Boards", IEEE Transactions on Components, Packaging and Manufacturing Technology, 2015, 12 pages.

U.S. Appl. No. 14/340,610, filed Jul. 25, 2014.

U.S. Appl. No. 14/340,614, filed Jul. 25, 2014.

* cited by examiner

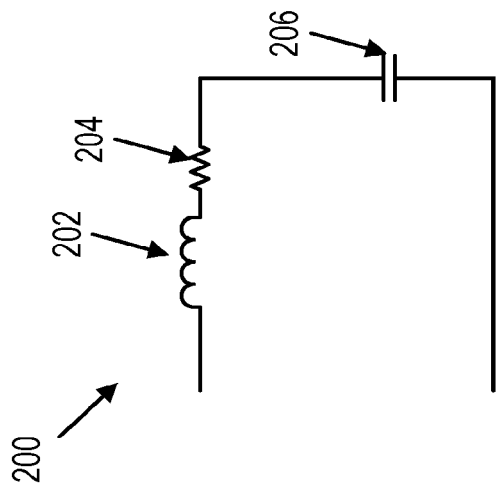
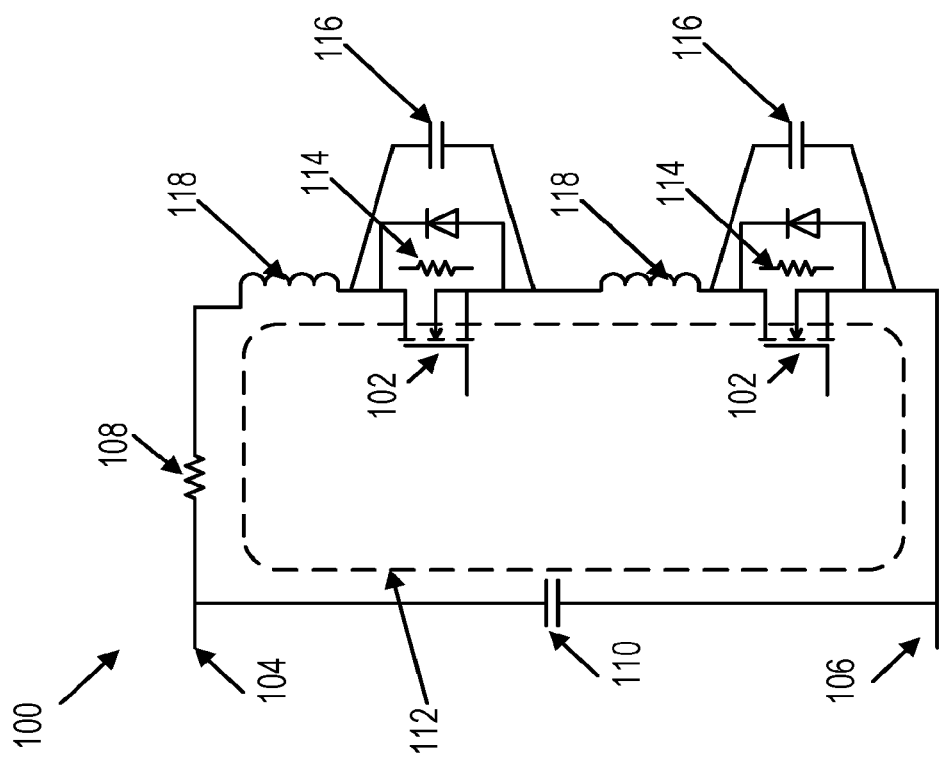
Fig. 1B
Fig. 1A

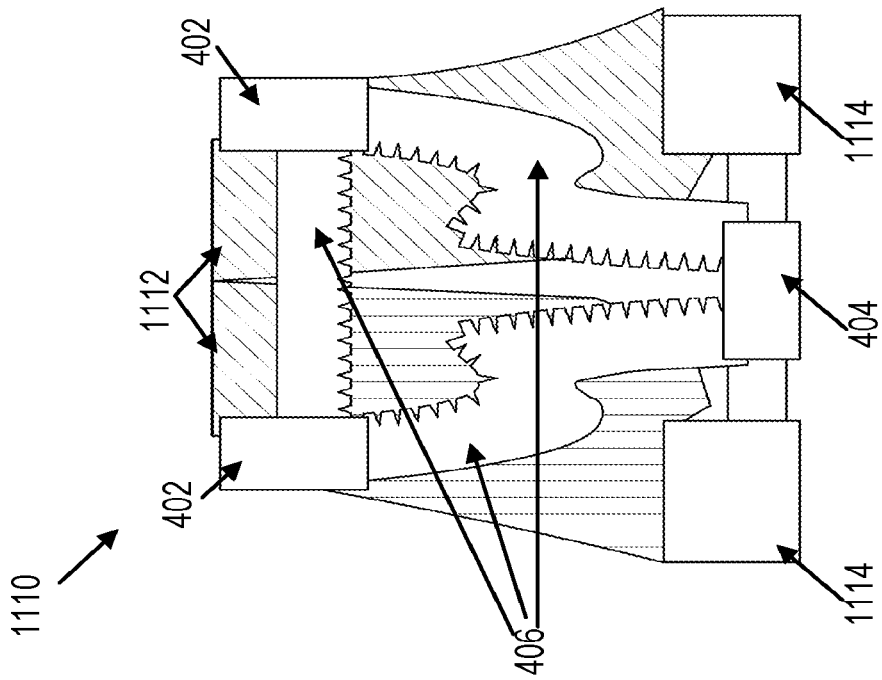
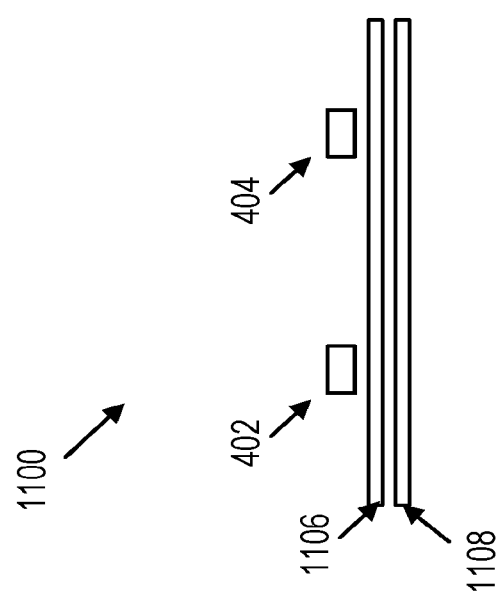
Fig. 11B
Fig. 11A

SWITCHING CIRCUIT INCLUDING WIRE TRACES TO REDUCE THE MAGNITUDE OF VOLTAGE AND CURRENT OSCILLATIONS

BACKGROUND

Voltage and current oscillations and electromagnetic interference (EMI) can develop in circuits with high-speed switches. Oscillation damping can be achieved by the design of wire traces and other types of damping circuits. U.S. Patent Application No. 2005/0068751 A1 entitled "Floating Trace on Signal Layer" by Kim et al. describes a printed circuit board (PCB) having a floating trace on a signal plane that provides impedance damping and reduces resonance between voltage planes.

SUMMARY

The present disclosure is directed to designing wire traces for a PCB-mounted switching circuit that reduce a magnitude of current and voltage oscillations that are produced during switching transients. In an exemplary implementation, an electrical circuit has one or more parallel layers with one or more electronic components of a switching circuit configured to operate at one or more frequencies mounted to a first surface of an upper layer of the electrical circuit. The electronic components are electrically connected by wire traces having cutouts with predetermined patterns and dimensions formed along edges where AC current flow is concentrated in order to increase an effective edge length of the wire traces.

The electronic components can include semiconductor switches, such as silicon (Si), gallium nitride (GaN) or silicon carbide (SiC) switches.

Switching transients produce second order current and voltage oscillations in the switching circuit when the one or more switching components are turned on or off. The cutouts formed along the edges of the wire traces where the AC current flow is concentrated can increase a damping factor in order to reduce the current and voltage oscillations.

Increasing the effective edge length of the wire traces can increase an AC resistance of the switching circuit.

A depth of the cutouts is based on a switching frequency of the switching circuit, and the depth of the cutouts for the switching circuit increases as the switching frequency increases.

A distance between the cutouts can be based on a switching frequency and a magnitude of transient oscillations.

The cutouts can have a shape that is triangular, rounded, square, rectangular, or asymmetric/non-uniform.

A total width of the wire traces can be greater than or equal to a skin depth of the AC current plus an average trace width. DC resistance of the wire traces can be based on the average trace with.

In another exemplary implementation, a process can include: determining one or more physical and operational parameters for a switching circuit based on a schematic structure of the switching circuit, dimensions of an available area on a printed circuit board (PCB), and size of one or more electronic components of the switching circuit; developing a circuit model for the switching circuit based on an equivalent inductance, capacitance, and resistance of the one or more electronic components of the switching circuit; and determining a design and layout for wire traces connecting the electronic components of the switching circuit including patterns and dimensions of a plurality of cutouts formed along edges of the wire traces where AC current flow is concentrated.

The physical parameters for the switching circuit can include at least one of a number, type, and size of the electronic components, circuit structure, and dimensions of an area on the PCB for the switching circuit to be mounted.

The operational parameters for the switching circuit can include at least one of an average switching frequency, current, operating voltage, and an operating temperature.

Developing the circuit model for the switching circuit further includes: determining an inductance and resistance associated with the wire traces; and determining a resistance and capacitance associated with the one or more electronic components of the switching circuit.

Determining the design and layout for the wire traces further includes: determining the patterns and dimensions for the plurality of cutouts based on increasing an AC resistance of the wire traces and decreasing a DC resistance and inductance of the wire traces. Determining the layout for the wire traces also includes: determining a ratio of the DC resistance to the AC resistance for the switching circuit; and designing the patterns and dimensions for the plurality of cutouts based on the ratio.

In another exemplary implementation, a printed circuit board (PCB) has one or more parallel layers with one or more electronic components of a switching circuit configured to operate at one or more frequencies mounted to a first surface of an upper layer of the PCB. The electronic components are electrically connected by wire traces having cutouts with predetermined patterns and dimensions formed along edges where AC current flow is concentrated in order to increase an effective edge length of the wire traces. Thermal traces are mounted to a second surface of a lower layer of the PCB and connected to the one or more electronic components in parallel with the wire traces to extract heat from the switching circuit. The thermal traces can provide a secondary current path for the switching circuit.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is an exemplary schematic diagram of a switching circuit;

FIG. 1B is an exemplary schematic diagram of an equivalent switching circuit;

FIG. 11A is an exemplary side view of a printed circuit board design;

FIG. 11B is an exemplary top view of a printed circuit board design; and

DETAILED DESCRIPTION

Figure 2:
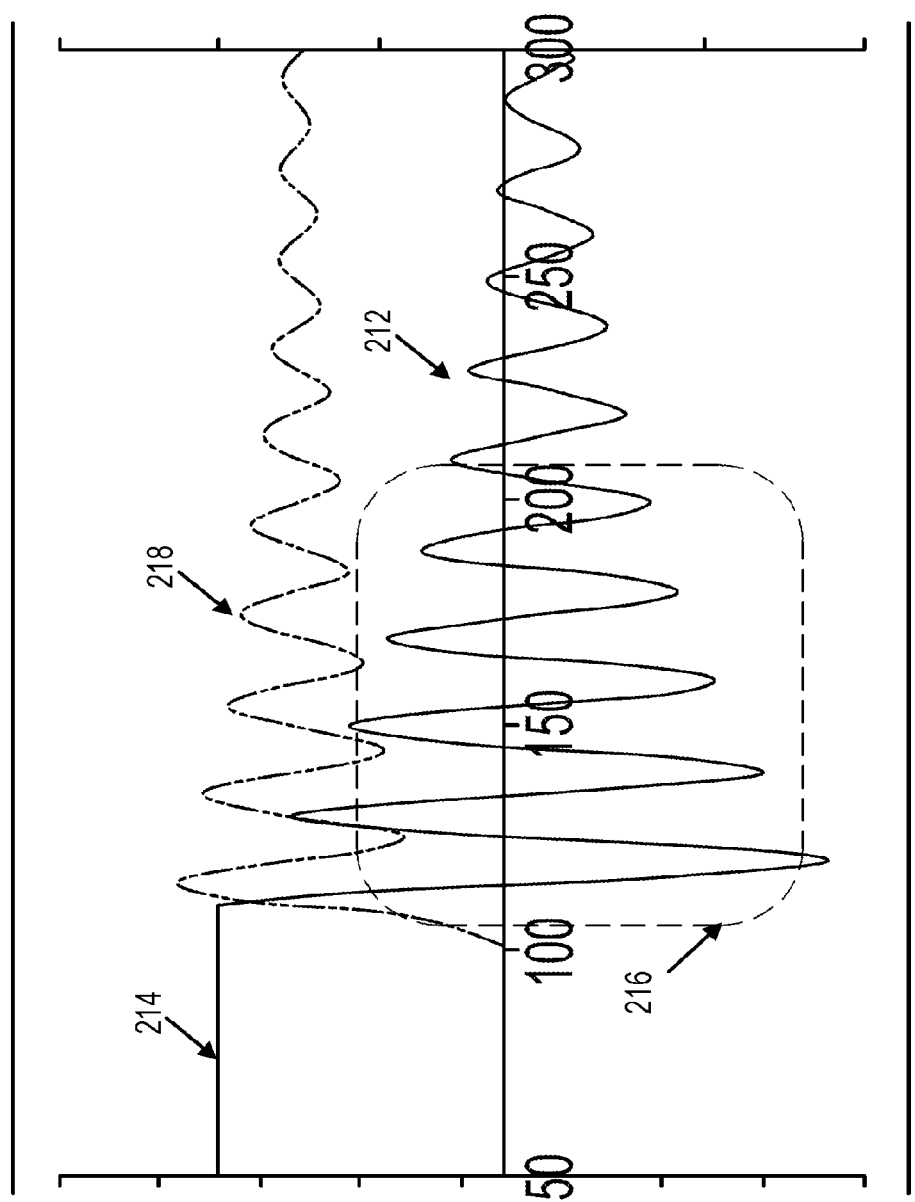
FIG. 2 is an exemplary graph illustrating current and voltage oscillations of a switching circuit.

In the drawings, like reference numerals designate identical or corresponding parts throughout the several views. Further, as used herein, the words "a," "an" and the like generally carry a meaning of "one or more," unless stated otherwise. Furthermore, the terms "approximately," "about," and similar terms generally refer to ranges that include the identified value within a margin of 20%, 10%, or preferably 5%, and any values therebetween.

FIG. 1A is an exemplary schematic diagram of a switching circuit 100. Electrical components of the switching circuit 100, such as switching devices 102 and DC capacitor 110 can be configured on printed circuit board (PCB) and electrically connected by metallic wire traces. In certain implementations, the switching circuit 100 includes two switching devices 102, such as MOSFETs, connected in series to a power input 104 and a power output 106 by a wire trace having trace resistance 108. In some implementations, the power input 104 and power output 106 are connected by the DC capacitor 110, which forms a current path 112 with the switching devices 102. In addition, the DC capacitor 110 can function as a power source for the switching circuit 100.

As the switching devices 102 are turned on and off, current flowing through the current path 112 is also turned on and off. Each of the switching devices 102 may also have an internal resistance 114 and/or a stray capacitance 116 that are intrinsic properties of the switching devices 102. In addition, the wire trace can exhibit stray inductance 118, which is a function of an area of the wire trace. In some implementations, during a switching period, high frequency voltage and current oscillations are produced due to the stray inductance 118 of the wire trace, stray capacitance 116 of the switching devices 102, the wire trace resistance 108, and the stray resistance 114 of the switching devices 102. For example, the stray inductance 118 produces current overshoot when the switching devices 102 are turned off. In some implementations, the oscillations or ringing produced by the switching devices 102 can be characterized by second order functions as will be discussed further herein.

In some implementations, the wire trace resistance 108 as well as the stray resistance 114 of the switching devices 102 may exhibit both DC resistance and AC resistance. The DC resistance is based on length and area of the wire trace in accordance with equation, $$R_{DC} = \rho \frac{l}{A},$$

where ρ represents a resistivity of the wire trace, l represents length of the wire trace, and A represents area of the wire trace. The AC resistance, also referred to as skin effect, is can be described by the following equation for skin depth:

$$\delta = \sqrt{\frac{2\rho}{\omega \mu_r \mu_o}},$$

where ω represents angular frequency, $\mu_o$ represents relative magnetic permeability, and, $\mu_r$ represents permeability of free space. As will be discussed further herein, aspects of the present disclosure are directed toward decreasing the DC resistance and increasing the AC resistance of the wire traces to reduce voltage and current oscillations that occur when the switching devices 102 are turned on and off.

FIG. 1B is an exemplary schematic diagram of an equivalent circuit 200 of the switching circuit 100. Throughout the disclosure, the switching circuit 100 and the switching circuit 200 can be referred to interchangeably. In some implementations, an equivalent inductance 202 can represent the stray inductance 118 of the wire trace of the switching circuit 100. In addition, equivalent resistance 204 can represent a total resistance of the switching circuit, which can include at least one of the wire trace resistance 108 and the internal resistance 114 of the switching devices 102. In addition, the equivalent resistance 204 can include both DC resistance and AC resistance. Equivalent capacitance 206 can represent the stray capacitance 116 of the switching devices 102. During switching transients, such as when the switching devices 102 are cycled on and off, the voltage and current of the switching circuit 100 oscillate based on a second order equation described by transfer function, $$G(s) = \frac{1}{s^2 LC + sCR + 1},$$

where L represents the equivalent inductance 202, R represents the equivalent resistance 204, and C represents the equivalent capacitance 206. The equivalent circuit 200 can also be referred as a LCR circuit model of the switching circuit 100.

FIG. 2 is an exemplary graph illustrating current and voltage oscillations of the switching circuit 100 when at least one of the switching devices 102 is turned off at point 210. For example, current curve 212 illustrates load (DC) current 214 when the switching devices 102 are turned on. When the switching devices 102 are turned off, the current decreases and AC current oscillations 216 are produced. In addition, voltage curve 218 illustrates that when the switching devices 102 are turned on, device voltage is zero, but when the switching devices 102, the voltage 218 increases and oscillations are produced. The current and voltage oscillations are second order oscillations, according to some implementations. The voltage and current oscillations are dampened over time based on a damping factor for the switching circuit 200, which is dependent on the equivalent resistance 204, equivalent inductance 202, and equivalent capacitance 206. For example, the damping factor, ζ, can be described by the equation, $$\zeta = \frac{\alpha}{\omega_0} = \frac{R}{2}\sqrt{\frac{C}{L}},$$

where α represents an attenuation factor and $\omega_o$ represents an angular resonance frequency of the switching circuit 200.

Figure 3:
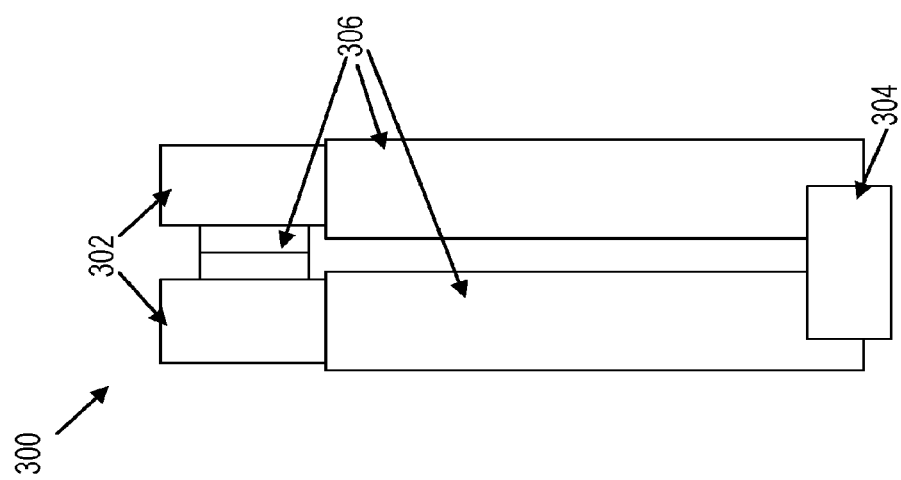
FIG. 3 is an exemplary illustration of conventional wire traces for a switching circuit.

FIG. 3 is an exemplary illustration of a switching circuit 300 with conventional wire traces. The switching circuit 300 is one implementation of the switching circuit 100 described previously with respect to FIG. 1. For example, switching devices 302 correspond to the switching devices 102 and capacitor 304 corresponds to the DC capacitor 110, which are connected by wire traces 306 that are made of plated copper wire. Design parameters of the wire traces 306, such as length, area, and shape, can be determined based on PCB area, frequency, operating parameters of the switching devices 302, and the like. For example, as the lengths of the wire traces 306 are increased, AC resistance increases, which can result in improved oscillation damping. However, as the lengths of the wire traces 306 increase, the DC resistance also increases, which can reduce efficiency of the switching circuit 300 and/or cause thermal issues. In some implementations, circuits such as the switching circuit 300 are designed with the wire traces 306 having increased widths to reduce DC resistance in addition to a reduced length in order to reduce the stray inductance 118 of the wire trace. However, the AC resistance of wider, shorter wire traces 306 may not be great enough to damp the oscillations. In addition, the length, area, and shape of the wire traces 306 can also be based on reducing the stray inductance of the wire traces which can be a factor in causing the voltage and current oscillations in the switching circuit 300. As the stray inductance is reduced, the oscillations may approximate a first order system, but other physical properties of the switching circuit 300 such as thermal density, sensor port connections, and gate drive connections may limit the reduction of the stray inductance of the wire traces 306.

In addition, as design improvements to the switching devices 302 result in ultra-low stray resistance 114, such as with gallium nitride (GaN) and/or silicon carbide (SiC) switching devices, a resulting damping factor may not be able to reduce the second order oscillations illustrated by the graph of FIG. 2. For example, as switching speed increases, AC current frequency through the switching circuit 300 increases, and magnitude of the current and voltage oscillations increases. If AC resistance of the switching circuit 300 is reduced below a predetermined threshold, then the oscillations may not be able to be reduced due to the damping effects of the AC resistance, which can result in electromagnetic interference (EMI).

Figure 4:
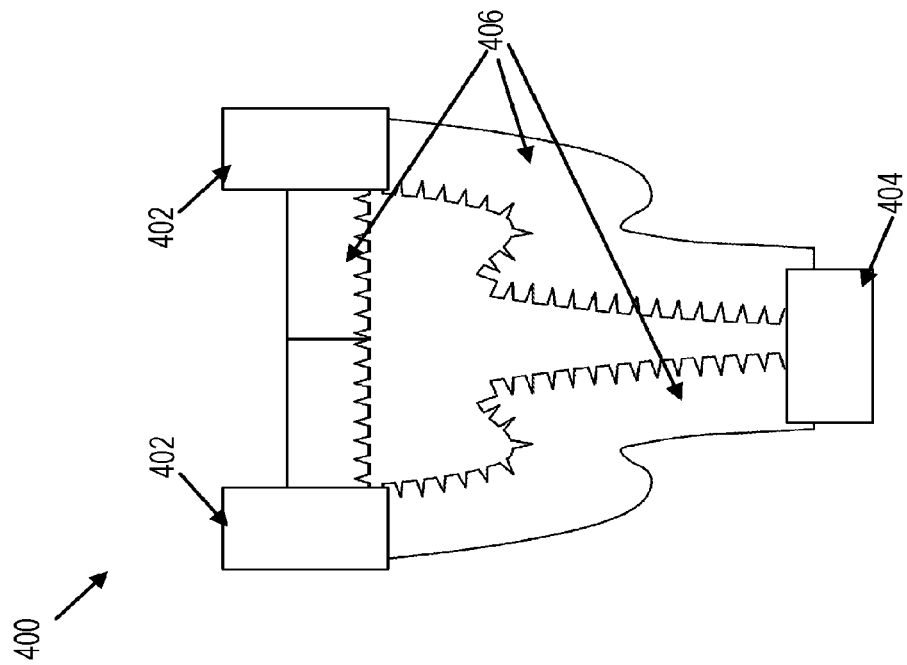
FIG. 4 is an exemplary illustration of wire traces for a switching circuit.

FIG. 4 is an exemplary illustration of a switching circuit 400 with wire traces designed to reduce second order oscillations caused by switch transients. The switching circuit 400 is one implementation of the switching circuit 100 described previously with respect to FIG. 1. For example, switching devices 402 correspond to the switching devices 102 and capacitor 404 corresponds to the DC capacitor 110, which are connected by wire traces 406. The wire traces are designed to reduce EMI and oscillations that result from switching based on the AC resistance, DC resistance, and inductance of the wire traces 406. The wire traces 406 can have a plurality of cutouts, also referred to as notches or grooves, formed on edges of the wire traces 406 where AC current flow is concentrated in order to increase the total AC resistance of the wire traces 406. In some implementations, because of the skin effect as well as an intrinsic effect caused by Lorentz forces, as current flows through the wire traces 406, the AC current is concentrated at inner edges of the wire traces 406. The cutouts along the inner edges of the wire traces 406 increase a total effective AC current length, which increases a total AC resistance of the wire traces 406. Shape, size, depth, and number of notches along the inner edges of the wire traces 406 can be based on properties of the switching circuit 400, such as operating frequency, PCB size, distance between the switch devices 402 and/or capacitor 406, stray and resistance inductance of the wire traces 406, stray capacitance and resistance of the switching devices, and the like.

In addition, the wire traces 406 may also have a predetermined curved shape to achieve design criteria such as an increased AC resistance and/or decreased DC resistance. Details regarding the design parameters of the cutouts along the inner edges of the wire traces 406 as well as the shape of the wire traces are discussed further herein. The switching circuit 400 illustrates just one implementation of the wire traces 406 having the grooves formed along the inner edges. The wire traces 406 can also be implemented in other types of circuits that experience oscillations during voltage and current transients, such as DC-DC converter circuits.

Figure 5:
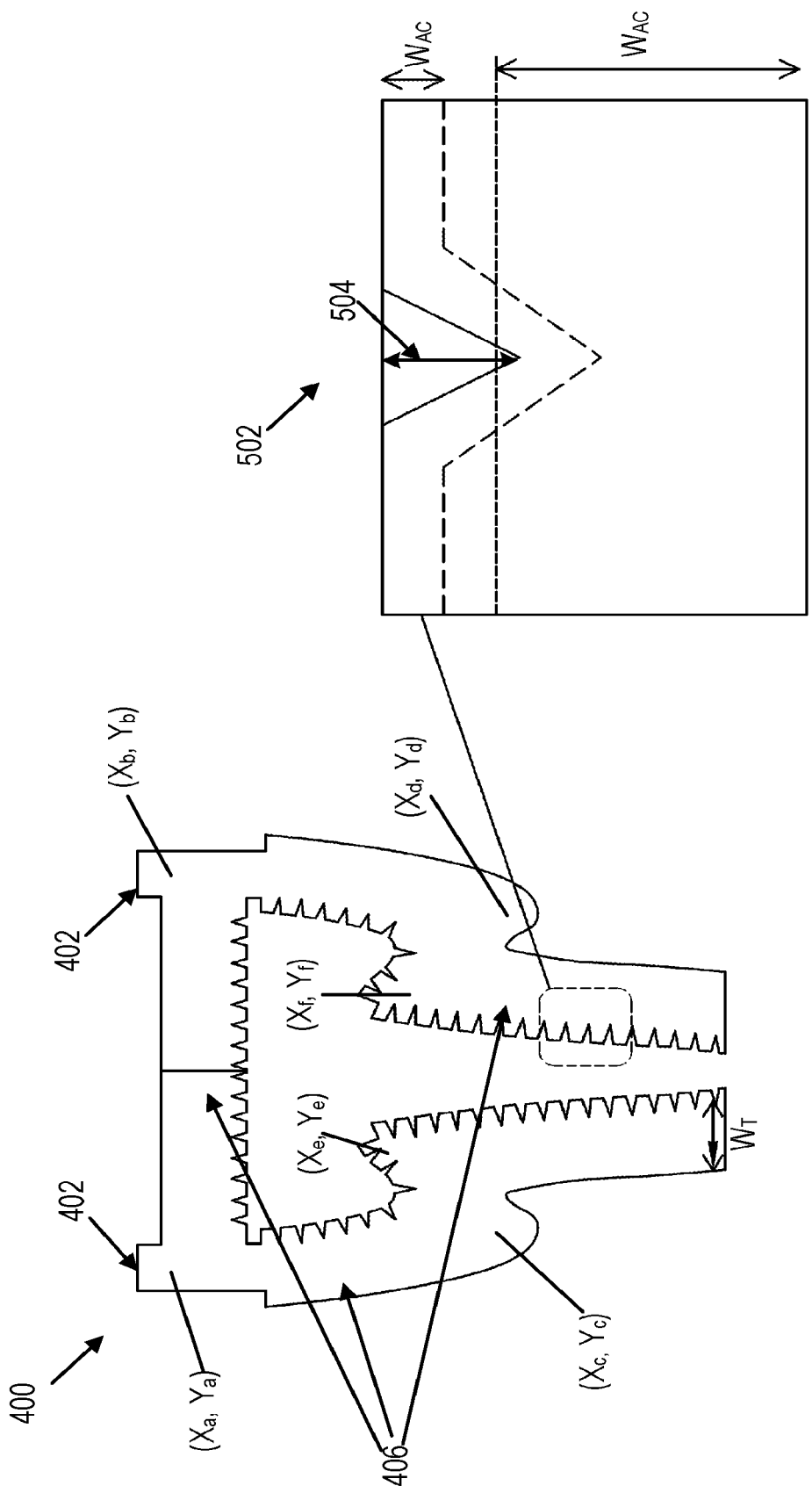
FIG. 5 is an exemplary illustration of design parameters for wire traces of a switching circuit.

FIG. 5 is an exemplary illustration of design parameters for the wire traces 406 of the switching circuit 400. As shown in FIG. 5, components of the switching circuit 400 can be located at predetermined points on the PCB. In some implementations, the points can be identified by a horizontal coordinate, X, and a vertical coordinate, Y. For example, the switching devices 402 are located at points $(X_a, Y_a)$ and $(X_b, Y_b)$. The capacitor 404 is not shown in FIG. 5 in order to illustrate the design parameters of the wire traces 406. The locations of the components of the switching circuit 400 can be based on circuit space limitations, EMI of the components, and other types of limitations. In addition, the wire traces 406 can also include one or more design points associated with a layout of the wire traces 406 that can include shape and/or curvature of the wire traces 406. For example, the design points can include locations on the PCB where the wire traces 406 bend or curve such as points $(X_c, Y_c)$, $(X_d, Y_d)$, $(X_e, Y_e)$, and $(X_f, Y_f)$. In some implementations, the design points are determined based on performance criteria of the switching circuit 400. For example, the curved shape can be determined based on increasing the AC resistance of the wire traces 406 while reducing the stray inductance and/or DC resistance so that the voltage and/or current oscillations are reduced below a predetermined threshold and circuit losses are also maintained below a predetermined threshold.

FIG. 5 also illustrates design parameters for a cutout 502, along the inner edges of the wire traces 406. The cutout 502 can have a triangular "V" shape as shown in FIG. 5 or any other type of shape such as rounded, square, rectangular, asymmetric/non-uniform, and the like. In addition, the plurality of cutouts formed along the inner edges of the wire traces 406 can have corresponding shapes and dimensions or may also have differing shapes and/or unequal dimensions. In addition, the cutouts can be formed in predetermined patterns along the inner edges of the wire traces 406. For example, the cutouts may be equally or unequally spaced along the inner edge of the wire traces 406. In some implementations, the number of cutouts formed along a predetermined length of the wire traces 406 can be based on signal frequency and magnitude of the transient oscillations. For example, as the magnitude of the current and/or voltage oscillations increase when the switching devices 402 are turned on and off, the number of cutouts along the predetermined length of the wire traces 406 can be increased. Increasing the number of cutouts on the wire traces increases a total effective length of the inner edge of the wire traces, which increases the AC resistance to dampen the oscillations.

In some implementations, the dimensions of the cutout 502 are designed based on characteristics of the switching circuit signals. The dimensions of the cutout 502 may be designed to achieve predetermined AC resistance and DC resistance values for the wire traces 406. For example, the AC resistance is based on a skin depth $W_{AC}$, and the DC resistance is based on an average trace width $W_{DC}$ of the wire traces 406. In some implementations, the average trace width $W_{DC}$ can be calculated over a predetermined length of the wire traces 406 and takes into account the loss in thickness due to cutouts formed along the inner edges of the wire traces 406. The dimensions of the cutout 502, such as depth 504, total length, and shape may be based on achieving values of $W_{AC}$ and $W_{DC}$ that reduce the oscillations and total circuit losses. For example, increasing the skin depth $W_{AC}$ increases a damping effect on the oscillations, and increasing the average trace width $W_{DC}$ increases an area for the DC current to travel, which may decrease the DC resistance of the wire traces 406.

In addition, a depth 504 of the cutout may be determined based on the switching frequency of the switching devices 402. As the switching frequency increases, the depth of the cutout 502 is increased, which increases the skin depth $W_{AC}$ and provides a current path for the higher frequency signals. The depth of the cutout 502 may be reduced for signals having lower switching frequencies because lower frequency signals may not be able to penetrate deeper cutouts, which results in a lower skin depth $W_{AC}$. For example, the cutout depth 504 for a 1.0 Megahertz (MHz) frequency signal may be greater than the cutout depth 504 for a 10 kHz signal. Also, increasing the cutout depth 504 has a negative effect on DC current such that the DC current is driven away from the inner edges of the wire traces where the AC current flows. By pushing the DC current away from the inner edges that have the increased effective length from the formation of the cutouts, the cutouts do not contribute to increasing the DC resistance. In addition, a total width $W_T$ of the wire trace 406 is based on the skin depth $W_{AC}$ and average trace width $W_{DC}$ and may be greater than or equal to a sum of $W_{AC}$ and $W_{DC}$.

Figure 6:
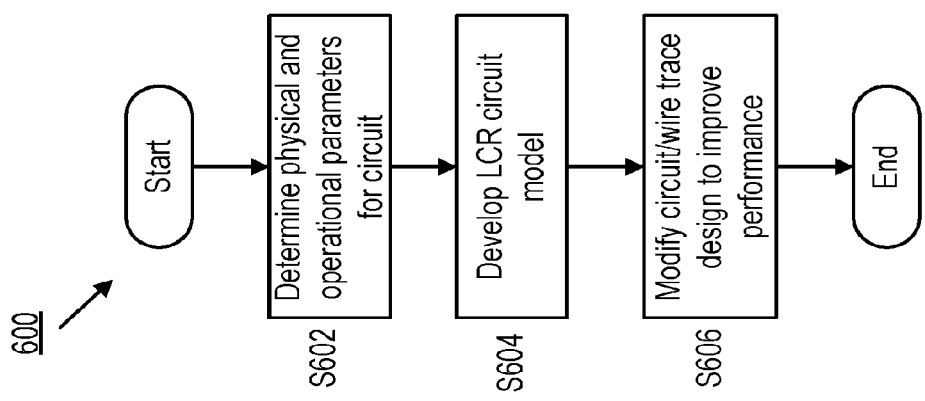
FIG. 6 is an exemplary flowchart of a method for designing wire traces for a switching circuit.

FIG. 6 is an exemplary flowchart of a method for designing a switching circuit 600. The method can be applied to the switching circuit 100 or any other type of circuit that includes switching devices that generate oscillations from properties of the electronic devices and/or wire traces such as the stray inductance of the wire traces and/or stray capacitance of the switching devices. The method 600 is described herein with respect to the switching device 400.

At step S602, physical and operational parameters for the switching circuit 400 are determined. In some implementations, the physical parameters for the switching circuit 400 can include at least one of number, type, and characteristics of the semiconductor devices, number and type of other circuit components, circuit topology, and design space information. In addition, operational design parameters can also be determined, which can include an average switching frequency, current, operating voltage, and/or operating temperature of the switching circuit 400. For example, the semiconductor devices can include GaN switches, SiC switches, and any other type of switching device. The characteristics of the semiconductor devices can also include the stray resistance and/or stray capacitance of the switching devices based on the switching frequency and/or other operational design parameters. In addition, a capacitance value and size of the DC capacitor 404 that functions as a power source for the switching circuit 400 can also be determined.

In some implementations, the circuit topology can include an overall circuit structure. For example, the switching circuit 400 is an implementation of the circuit structure for the switching device 100 described in FIG. 1. The switching circuit 400 includes two switching devices 402, such as MOSFETs, connected in series to a power input and a power output by a wire trace. In some implementations, the power input and power output are connected by the DC capacitor 404, which forms a current path with the switching devices 402. In addition, the DC capacitor 404 can function as a voltage source for the switching circuit 400. The design space information can include dimensions of available area on the PCB for the switching circuit to be mounted, size of the switching devices and other circuit components, and the like. Estimated distances between the switching devices and other circuit components can also be determined based on the size of the components and the design space information.

At step S604, the LCR circuit model is developed for the switching circuit 400 based on the equivalent inductance, equivalent resistance, and equivalent capacitance values of the wire traces and circuit components. For example, with respect to the switching circuit 400, the LCR circuit model can correspond to the equivalent circuit 200 described previously with respect to FIG. 2. In some implementations, the LCR circuit model can include an equivalent inductance, capacitance, and resistance of the switching circuit 400 based on the design and operational parameters of the switching devices and other circuit components. The LCR circuit model can also be based on wire trace parameters that can be estimated based on the switching frequency and/or estimated distances between the components of the switching circuit 400. In some implementations, the LCR circuit model uses trace inductance and resistance parameters based on the wire traces 406 having smooth edges without cutouts. In other implementations, the LCR circuit model uses the trace inductance and resistance parameters for the wire traces 406 having cutouts formed in predetermined patterns and with predetermined dimensions along the inner edge of the wire traces.

The equivalent inductance of the LCR circuit model can represent a stray inductance of the wire traces 406 of the switching circuit 400. In addition, an equivalent resistance of the LCR circuit model can represent a total resistance of the switching circuit 400, which can include the resistance of the wire traces 406 and/s the internal resistance of the switching devices 402. The equivalent resistance can include both DC resistance and AC resistance. The equivalent capacitance can represent the stray capacitance of the switching devices 402. In some implementations, the equivalent inductance, capacitance, and DC/AC resistance for the circuit components and wire traces 406 can be determined with simulation software and/or circuit test equipment as would be known to one of ordinary skill in the art. In some implementations, the LCR circuit model can be used to determine the skin depth and/or damping factor of the switching circuit 400 for one or more operating frequencies.

At step S606, a circuit and wire trace design can be modified to improve performance of the switching circuit 400. The performance of the switching circuit 400 can be improved by modifying device positions, wire trace edge structure, and/or trace width. In some implementations, the wire traces 406 are designed to increase the AC resistance of the wire traces 406 while keeping the DC resistance as low as possible. In addition, the wire traces 406 may be designed so that the switching circuit 400 achieves a predetermined ratio of DC current flow to AC current flow, which is based on the DC resistance and AC resistance of the wire traces. In one implementation, the wire traces 406 can be designed to achieve 1:1 ratio of DC current flow to AC current flow. In addition, the position of the switching devices 402 and other circuit components can be modified to improve performance of the switching circuit 400. For example, moving the location of the DC capacitor 404 to be closer in proximity to the switching devices 402 can reduce the total length of the wire traces 406, which may reduce the DC resistance of the switching circuit 400.

In some implementations, the cutouts along the inner edge of the wire traces 406 can be added and/or modified to improve one or more performance criteria of the switching circuit 400, such as the damping factor, AC resistance, DC resistance, wire trace inductance, and the like. For example, the cutouts can have a triangular "V" shape or any other type of shape such as rounded, square, rectangular, asymmetric/non-uniform, and the like. In addition, a plurality of cutouts formed along the inner edges of the wire traces 406 can have corresponding shapes and dimensions or may also have differing shapes and/or unequal dimensions. The cutouts can be formed in predetermined patterns along the inner edges of the wire traces 406, and the cutouts may be equally or unequally spaced along the inner edge of the wire traces 406. In some implementations, a distance between the cutouts can be based on switching frequency and magnitude of the transient oscillations. For example, as the magnitude of the current and/or voltage oscillations increase when the switching devices 402 are turned on and off, the distance between the cutouts along the wire traces 406 can be reduced. Increasing the number of cutouts on the wire traces increases a total effective length of the inner edge of the wire traces 406, which increases the AC resistance in order to dampen the current and voltage oscillations.

In some implementations, the dimensions of the cutouts are designed based on characteristics of the switching circuit signals. The dimensions of the cutouts may be designed to achieve predetermined AC and DC resistances for the wire traces 406 to improve performance of the switching circuit 400. For example, the AC resistance is based on a skin depth $W_{AC}$, and the DC resistance is based on an average trace width $W_{DC}$ of the wire traces 406. In some implementations, the average trace width $W_{DC}$ can be calculated over a predetermined length of the wire traces 406 and takes into account the loss in thickness due to cutouts formed along the inner edges of the wire traces 406. The dimensions of the cutout, such as depth, total length, and shape may be based on achieving values of $W_{AC}$ and $W_{DC}$ that reduce the oscillations and increase DC power by reducing total circuit losses. For example, increasing the skin depth $W_{AC}$ increases a damping effect on the oscillations, and increasing the average trace width $W_{DC}$ increases an area for the DC current to travel, which may decrease the DC resistance of the wire traces 406.

In addition, a depth of the cutout may be determined based on the switching frequency of the switching devices 402. As the switching frequency increases, the depth of the cutouts are increased, which increases the skin depth $W_{AC}$ and provides a current path for the higher frequency signals. The depth of the cutouts may be reduced for signals having lower switching frequencies because lower frequency signals may not be able to penetrate deeper cutouts, which results in a lower skin depth $W_{AC}$. Also, increasing the cutout depth may have a negative effect on DC current such that the DC current is driven away from the inner edges of the wire traces where the AC current flows. By pushing the DC current away from the inner edges that have the increased effective length from the formation of the cutouts, the DC resistance can be reduced. In addition, a total width $W_T$ of the wire trace 406 is based on the skin depth $W_{AC}$ and average trace width $W_{DC}$ and may be greater than or equal to a sum of $W_{AC}$ and $W_{DC}$.

Figure 7:
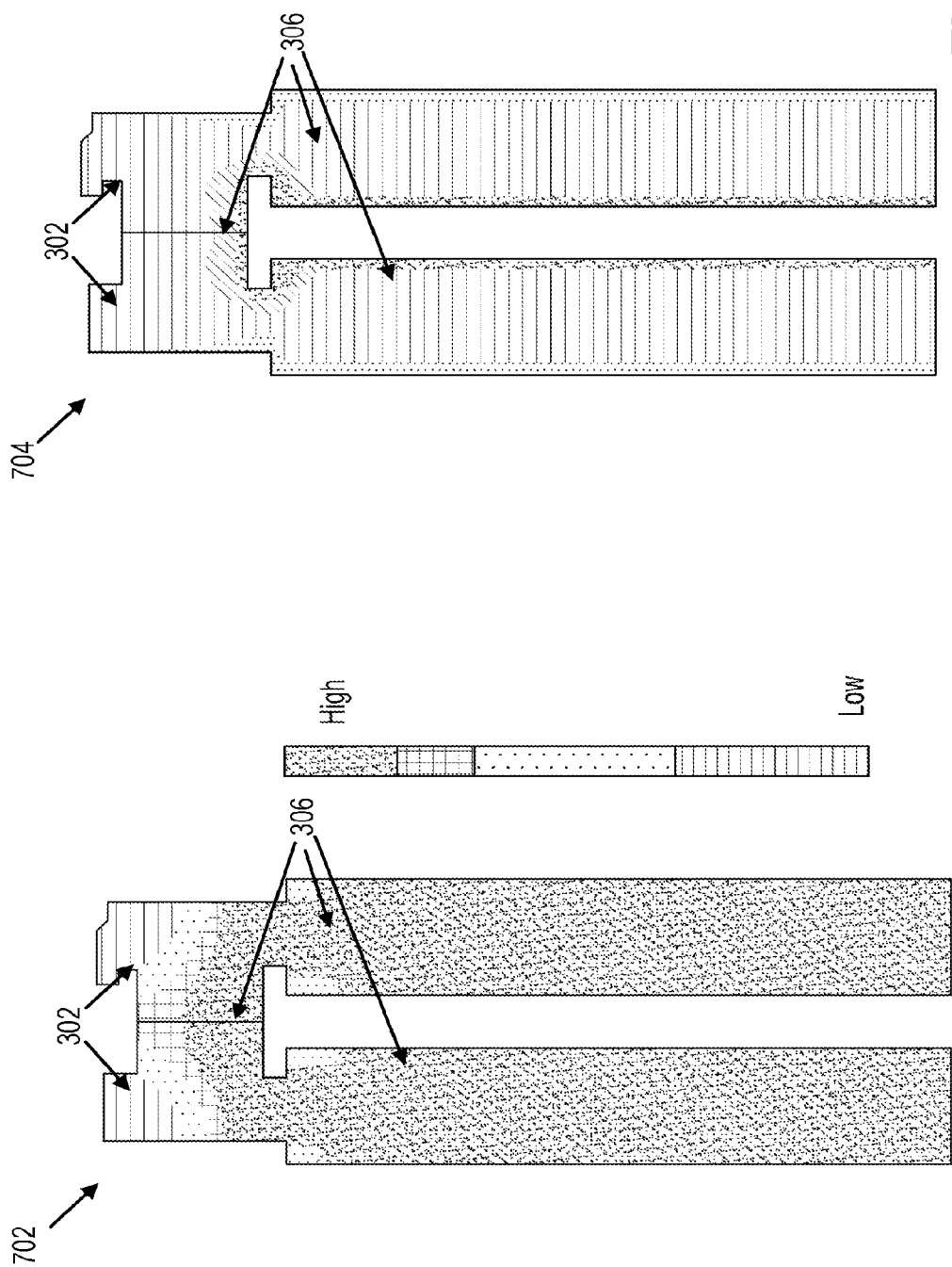
FIG. 7 is an exemplary illustration of DC and AC current density in wire traces of the switching circuit.

FIG. 7 is an exemplary illustration of DC and AC current density in the wire traces 306 of the switching circuit 300. Current density diagram 702 illustrates DC current flow through the switching circuit 300, and current density diagram 704 illustrates AC current flow. In addition, the current density diagrams 702 and 704 indicate high and low density regions of the switching circuit 300. The current density diagram 702 shows that the DC current density is highest across the thickness of the wire traces 306. In some implementations, increasing the density of the DC current spread decreases the total DC resistance of the wire traces 306, which reduces losses of the switching circuit 300. In addition, the current density diagram 704 shows that the AC current density is highest along the inner edges of the wire traces 306 and is lowest throughout center and outer regions of the wire traces 306. Since the AC current is concentrated along the inner edges of the wire traces 306, the AC resistance of the switching circuit 300 is based on a total length of the inner edges of the wire traces 306.

Figure 8:
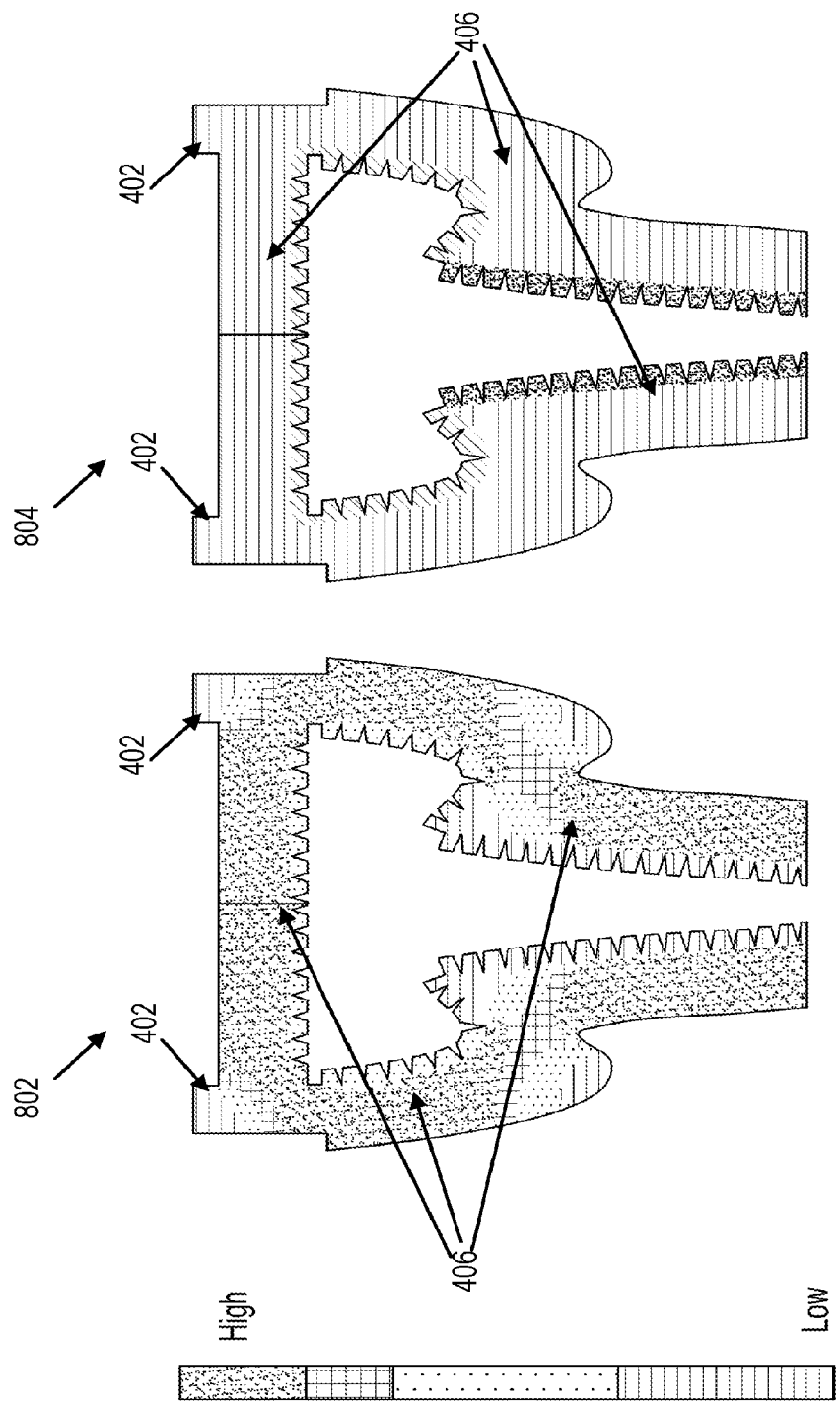
FIG. 8 is an exemplary illustration of DC and AC current density in wire traces of the switching circuit.

FIG. 8 is an exemplary illustration of DC and AC current density in the wire traces 406 of the switching circuit 400. Current density diagram 802 illustrates DC current flow through the switching circuit 400, and current density diagram 804 illustrates AC current flow. Like the current density diagrams shown in FIG. 7, the current density diagrams 802 and 804 indicate high and low density regions of the switching circuit 400. The current density diagram 802 shows that the DC current density is highest across the thickness of the wire traces 806 and lowest along the inner edges where the cutouts are located. By pushing the DC current away from the inner edges that have the increased effective length from the formation of the cutouts, the cutouts do not contribute to increasing the DC resistance. However, the wire traces 406 have more regions of lower DC current density across the total thickness $W_T$ than the wire traces 306 which contributes to causing an increase in DC resistance.

In addition, the current density diagram 804 shows that the AC current density is highest along the inner edges of the wire traces 406 along the cutouts and is lowest throughout center and outer regions of the wire traces 406. Increasing the effective length of the inner edges of the wire traces 406 contributes to increasing the total distance that the AC current travels throughout the switching circuit 400, which increases the total AC resistance and improves the damping of the current and voltage oscillations that occur as the switching devices 42 are turned on and off.

Figure 9:
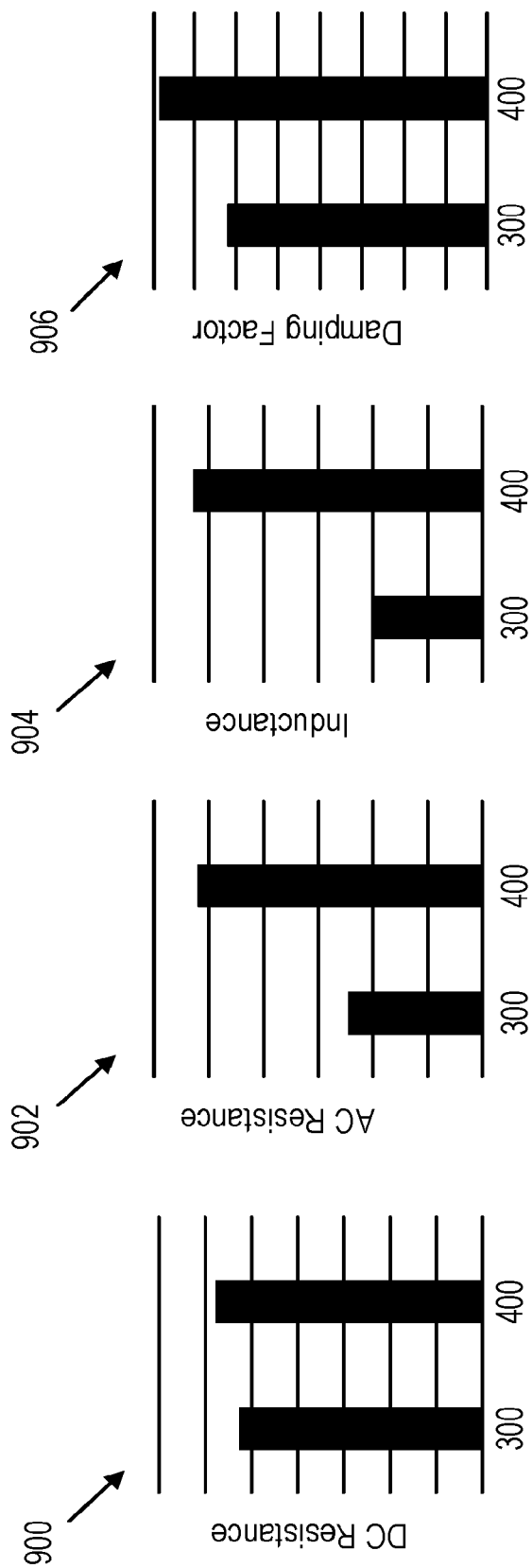
FIG. 9 illustrates graphs of design parameter values for switching circuits.

FIG. 9 illustrates graphs of design parameter values for the switching circuits 300 and 400. The design parameter values illustrated in FIG. 9 include DC resistance, AC resistance, inductance, and damping factor. Graph 900 illustrates that the total DC resistance for the switching circuit 400 is greater than the DC resistance for the switching circuit 300. In some implementations, the DC resistance can be dominated by the resistance of the switching devices and other circuit components, which may not be able to be overcome by the design of the wire traces 406. Graph 902 illustrates that the total AC resistance for the switching circuit 400 is over twice as large as the total AC resistance for the switching circuit 300. Therefore, adding the cutouts to the inner edges of the wire traces 406 more than doubles the AC resistance of the switching circuit 400, which increases oscillation damping during switching transients.

Graph 904 illustrates that the inductance of the switching circuit 400 is over twice as large as the inductance of the switching circuit 300. In some implementations, the stray inductance of the wire traces 306 and 406 produces current overshoot when the switching devices 320 and 402 are turned off and can be a factor in causing the voltage and current oscillations. Adding the cutouts to the inner edges of the wire traces 406 causes an increase in the inductance of the switching circuit 400, but the increased AC resistance and increased damping factor can provide more effective damping of the oscillations resulting from the increased inductance. In addition, graph 906 illustrates that the damping factor for the switching circuit 400 is larger than the damping factor for the switching circuit 300, which shows that the increased AC resistance from the cutouts contributes to improving the damping of the oscillations caused by turning the switching devices 402 on and off.

Figure 10:
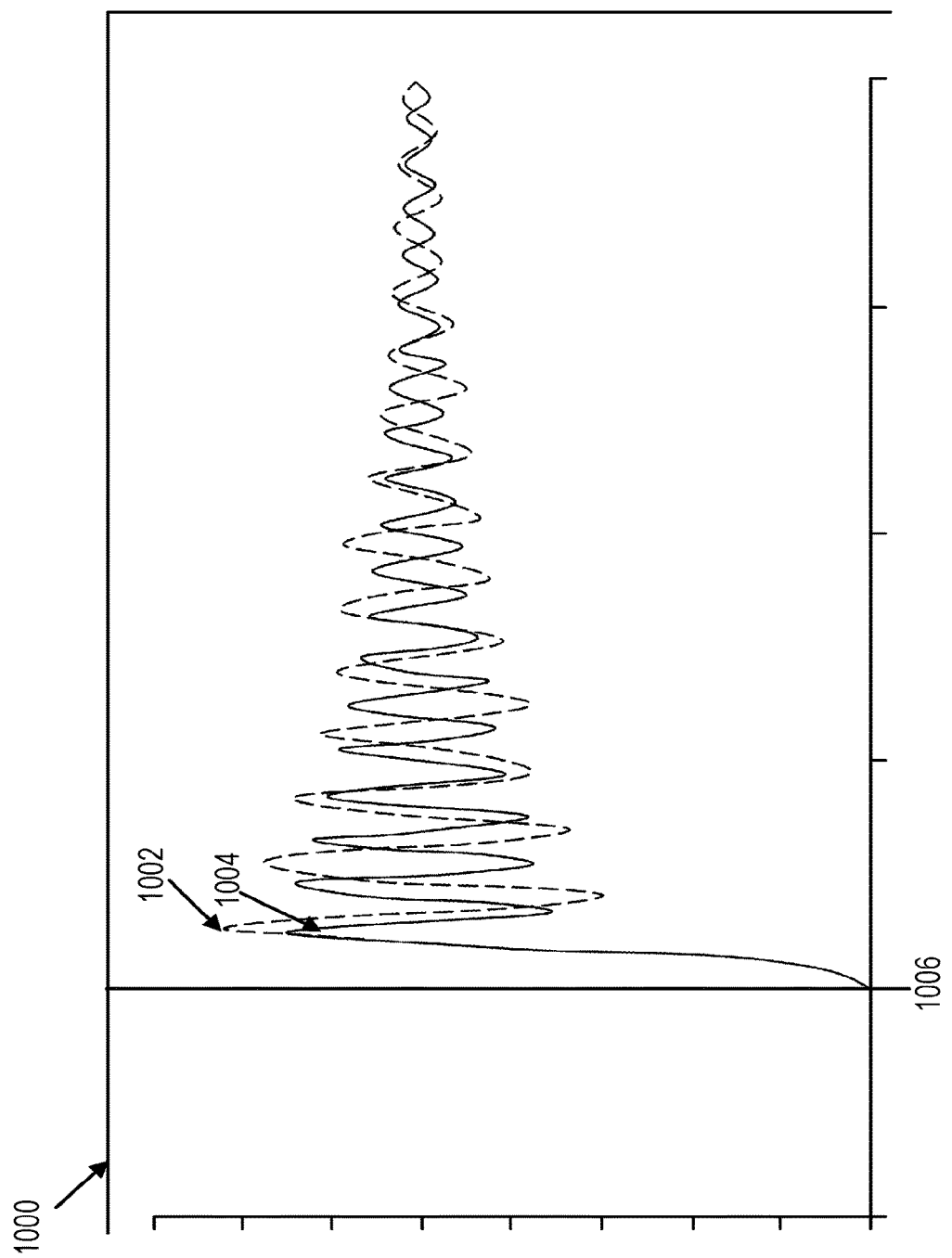
FIG. 10 is an exemplary graph illustrating damping of oscillations in switching circuits.

FIG. 10 is an exemplary graph 1000 illustrating damping of the switching circuits 300 and 400. Curve 1002 illustrates turnoff voltage for the switching circuit 300, and curve 1004 illustrates turnoff voltage for the switching circuit 400 when one or more of the switching devices 302 and 402 are turned off at time 1006. When the switching devices 302 and 402 are turned off, the voltage suddenly increases and continues to oscillate over time until damping results in a reduction of the magnitude of the voltage oscillations. The graph 1000 illustrates that the magnitude of the oscillations for the curve 1004 are less than the magnitude of the oscillations for the curve 1002 for an entire voltage transient, which shows that the wire traces 406 with the cutouts in the switching circuit 400 provide more effective damping than the wire traces 306 of the damping circuit 300.

FIGS. 11A and 11B illustrate a PCB design for the switching circuit 400. FIG. 11A illustrates a side view 1100 of the PCB, and FIG. 11B illustrates a top view 1110 of the PCB. Electronic devices of the switching circuit 400, such as the switching devices 402 and DC capacitor 404 are mounted on the PCB at predetermined locations based on the design determinations made during the performance of the method for designing a switching circuit 600. In some implementations, the PCB includes two parallel copper layers such as an upper electrical trace layer 1106 and a lower thermal trace layer 1108. Greater or fewer numbers of PCB layers can also be implemented with the switching circuit 400. The electronic devices of the switching circuit 400 as well as the wire traces 406 can be connected to the upper electrical trace layer 1106.

As shown in the top view 1110 of FIG. 11B, the lower thermal trace layer 1108 of the PCB can include a thermal spread trace 1112 or other materials that control heat flux generation of the switching circuit 400. In some implementations, an operating temperature of the switching circuit 400 can be reduced by extracting the heat from the electronic devices and directing the heat to thermal grounds 1114. The thermal grounds 1114 also functions as electrical power terminals connected to the DC capacitor 404 and a device pin of the switching devices 402. In one implementation where the switching circuit 400 includes two series-connected switching devices 402, one thermal ground 1114 is connected to a drain pad of one of the switching devices 402, and a second thermal ground 1114 is connected to a source pad of the other switching device 402 by the thermal spread traces 1112. In addition, because the thermal spread traces 1112 are connected in parallel with the wire traces 406, the thermal spread traces 1112 can be used as an electrical current path in addition to the wire traces 406. In some implementations, structure and design of the thermal spread traces 1112 and the thermal trace layer 1108 are determined when the method for designing a switching circuit 600 is performed. The methods used to design and implement the thermal spread trace 1112 on the thermal trace layer 1108 include at least those described by U.S. Pat. No. 8,516,831 B2 to E. Dede entitled, "Thermal Energy Steering Device;" U.S. Patent Application Publication 2014/0284039 A1 to E. Dede et al. entitled, "Thermal Energy Guiding Systems Including Anisotropic Thermal Guiding Coatings and Methods for Fabricating the Same;" U.S. Patent Application Publication 2014/0318829 A1 to E. Dede et al. entitled, "Printed Wiring Boards Having Thermal Management Features and Thermal Management Apparatuses Comprising the Same;" U.S. Patent Application Publication 2014/0318758 A1 to E. Dede et al. entitled, "Composite Laminae Having Thermal Management Features and Thermal Management Apparatuses Comprising the Same;" U.S. patent application Ser. No. 14/340,610 filed on Jul. 25, 2014, entitled, "Heat Transfer Management Apparatuses Having a Composite Lamina;" U.S. patent application Ser. No. 14/340,614 filed on Jul. 25, 2014, entitled, "Heat Transfer Management Apparatuses Having a Composite Lamina;" "Simulation and Optimization of Heat Flow via Anisotropic Material Thermal Conductivity, "E. M. Dede, Computational Materials Science, 50 (2010) 510-515; "Heat Flux Manipulation with Engineered Thermal Materials," S. Narayana and Y. Sato, Physical Review Letters, 108 (2012) 214303; "Thermal-Composite Design Optimization for Heat Flux Shielding, Focusing, and Reversal," E. M. Dede, T. Nomura, J. Lee, Structural and Multidisciplinary Optimization, In press; and "Heat Flux Cloaking, Focusing, and Reversal in Ultra-Thin Composites Considering Conduction-Convection Effects," the entire contents of which are all incorporated herein by reference.

Figure 12:
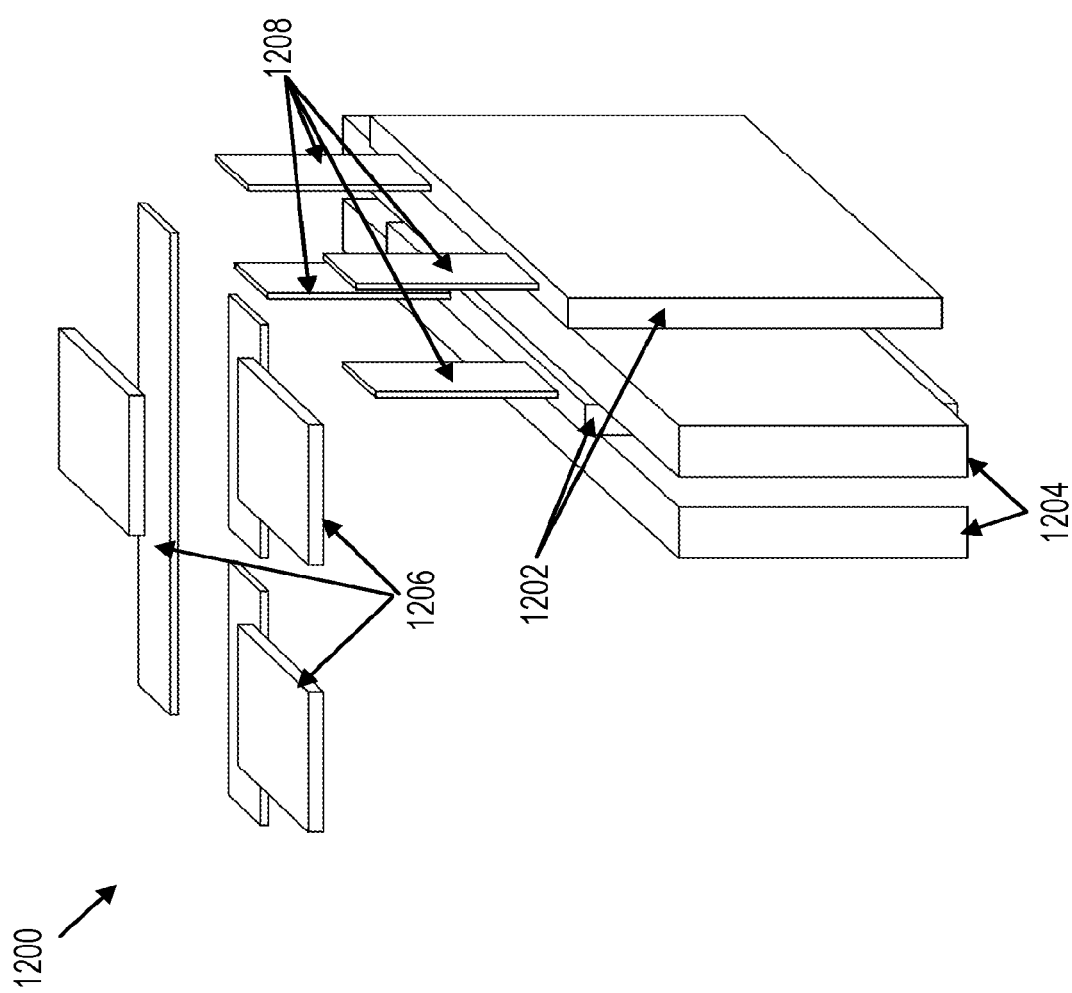
FIG. 12 is an exemplary illustration of a three-dimensional switching circuit.

FIG. 12 is an exemplary illustration of a three-dimensional switching circuit 1200. In some implementations, the method for designing a switching circuit 600 can be used to design switching circuits that may be more structurally complex than the switching circuit 400. For example, the three-dimensional (3D) switching circuit 1200 can include one or more switching devices 1202 that produce current and/or voltage oscillations when the switching devices 1202 are turned on and off. The switching devices 1202 can be separated by one or more heat sink devices 1204. In addition, the switching devices 1202 include one or more terminals 1208 such as drain and/or source terminals that are electrically connected to one or more bus bars 1206. Due to the 3D structure of the switching circuit 1200, flexibility of modify the switching circuit 1200 to increase oscillation damping, reduce stray inductance, and improve other design parameters may be may be less than the flexibility of modifying a 2D switching circuit on PCB, such as the switching circuit 400. However, external edges of the bus bars 1206 and/or device terminals 1208 can be configured with cutouts such as those described previously with respect to the wire traces 406. In some implementations, configuring the bus bars 1206 and/or device terminals 1208 with cutouts allows the AC resistance and damping factor of the switching circuit 1200 to be increased without modifying physical locations of electrical circuit components.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Accordingly, other implementations are within the scope that may be claimed.

The invention claimed is:

1. A device comprising:
an electrical circuit having one or more parallel layers;
at least two electronic components of a switching circuit configured to operate at one or more frequencies mounted to a first surface of an upper layer of the electrical circuit; and
wire traces configured to electrically connect the at least two electronic components having cutouts with predetermined patterns and dimensions formed along edges where AC current flow is concentrated to increase an effective edge length of the wire traces.

2. The device of claim 1, wherein the at least two electronic components include semiconductor switches.

3. The device of claim 2, wherein the semiconductor switches include silicon (Si), gallium nitride (GaN) or silicon carbide (SiC) switches.

4. The device of claim 1, wherein switching transients produce second order current and voltage oscillations in the switching circuit when the at least two electronic components are turned on or off.

5. The device of claim 4, wherein the cutouts formed along the edges of the wire traces increase a damping factor to reduce the current and voltage oscillations.

6. The device of claim 1, wherein increasing the effective edge length of the wire traces increases an AC resistance of the switching circuit.

7. The device of claim 1, wherein a depth of the cutouts is based on a switching frequency of the switching circuit.

8. The device of claim 7, wherein the depth of the cutouts for the switching circuit increases as the switching frequency increases.

9. The device of claim 1, wherein a distance between the cutouts is based on a switching frequency and a magnitude of transient oscillations.

10. The device of claim 1, wherein the cutouts have a triangular, rounded, square, rectangular, or asymmetric/non-uniform shape.

11. The device of claim 1, wherein a total width of the wire traces is greater than or equal to a skin depth of the AC current plus an average trace width.

12. The device of claim 11, wherein a DC resistance of the wire traces is based on the average trace width.

13. A method comprising:
determining one or more physical and operational parameters for a switching circuit based on a schematic structure of the switching circuit, dimensions of an available area on a printed circuit board (PCB), and size of at least two electronic components of the switching circuit;
developing a circuit model for the switching circuit based on an equivalent inductance, capacitance, and resistance of the at least two electronic components of the switching circuit;
determining a design and layout for wire traces connecting the at least two electronic components of the switching circuit including patterns and dimensions of a plurality of cutouts formed along edges of the wire traces where AC current flow is concentrated; and
fabricating the PCB based on the design and layout determined.

14. The method of claim 13, wherein the physical parameters for the switching circuit include at least one of a number, type, and size of the at least two electronic components, circuit structure, and dimensions of an area on the PCB for the switching circuit to be mounted.

15. The method of claim 13, wherein the operational parameters for the switching circuit include at least one of an average switching frequency, current, operating voltage, and an operating temperature.

16. The method of claim 13, wherein developing the circuit model for the switching circuit further comprises:
determining an inductance and resistance associated with the wire traces; and
determining a resistance and capacitance associated with the at least two electronic components of the switching circuit.

17. The method of claim 13, wherein determining the design and layout for the wire traces further comprises:
determining the patterns and dimensions for the plurality of cutouts based on increasing an AC resistance of the wire traces and decreasing a DC resistance and inductance of the wire traces.

18. The method of claim 17, wherein determining the layout for the wire traces further comprises:
determining a ratio of the DC resistance to the AC resistance for the switching circuit; and
designing the patterns and dimensions for the plurality of cutouts based on the ratio.

19. A device comprising:
a printed circuit board (PCB) having one or more parallel layers;
at least two electronic components of a switching circuit configured to operate at one or more frequencies mounted to a first surface of an upper layer of the PCB;
wire traces configured to electrically connect the at least two electronic components having cutouts with predetermined patterns and dimensions formed along edges where AC current flow is concentrated to increase an effective edge length of the wire traces; and
thermal traces mounted to a second surface of a lower layer of the PCB and connected to the at least two electronic components in parallel with the wire traces to extract heat from the switching circuit.

20. The device of claim 19, wherein the thermal traces provide a secondary current path for the switching circuit.

* * * * *